United States Patent
Kong

(10) Patent No.: US 10,788,923 B2
(45) Date of Patent: Sep. 29, 2020

(54) TOUCH SCREEN CONTROLLER, TOUCH SCREEN SYSTEM INCLUDING THE TOUCH SCREEN CONTROLLER, AND METHOD OF OPERATING THE TOUCH SCREEN CONTROLLER

(71) Applicant: Samsung Electronics Co., Ltd., Suwon-si (KR)

(72) Inventor: Tae-hwang Kong, Suwon-si (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 62 days.

(21) Appl. No.: 16/128,529

(22) Filed: Sep. 12, 2018

(65) Prior Publication Data

US 2019/0196642 A1 Jun. 27, 2019

(30) Foreign Application Priority Data

Dec. 27, 2017 (KR) .................. 10-2017-0181518

(51) Int. Cl.
G06F 3/041 (2006.01)
G06F 3/0354 (2013.01)
G06F 3/044 (2006.01)

(52) U.S. Cl.
CPC ........ G06F 3/0416 (2013.01); G06F 3/03545 (2013.01); G06F 3/044 (2013.01);
(Continued)

(58) Field of Classification Search
None
See application file for complete search history.

(56) References Cited

U.S. PATENT DOCUMENTS 9,013,429 B1 * 4/2015 Krekhovetskyy ... G06F 3/03545
345/173
9,030,050 B1 5/2015 Linjama et al.
(Continued)

FOREIGN PATENT DOCUMENTS

JP 2017-139029 A 8/2017
KR 10-1597275 2/2016
(Continued)

OTHER PUBLICATIONS

Changbyung Park et al. / A Pen-Pressure-Sensitive Capacitive Touch System Using Electrically Coupled Resonance Pen / IEEE Journal of Solid-State Circuits, col. 51, No. 1, Jan. 2016.

*Primary Examiner* — Nicholas J Lee
(74) *Attorney, Agent, or Firm* — Muir Patent Law, PLLC

(57) ABSTRACT

Provided are a touch screen controller, a touch screen system including the touch screen controller, and a method of operating the touch screen controller. The touch screen controller includes a driving circuit configured to output a first driving signal in a first touch mode and a second driving signal in a second touch mode, the first touch mode including a driving period and a subsequent sensing period; and a boosting circuit configured, in the first touch mode, to generate a first voltage by performing an internal switching operation based on an input voltage and a first switching signal, and configured to provide the first voltage to the driving circuit, wherein the first switching signal has a first frequency in the driving period and a second frequency different from the first frequency in the subsequent sensing period.

20 Claims, 14 Drawing Sheets

(52) U.S. Cl.
CPC ...... *G06F 3/0418* (2013.01); *G06F 3/041662* (2019.05); *G06F 3/0412* (2013.01)

(56) References Cited

U.S. PATENT DOCUMENTS

| | | |
|---|---|---|
| 9,035,919 B2 | 5/2015 | Cooke |
| 9,600,093 B2 | 3/2017 | Park et al. |
| 2011/0122087 A1 | 5/2011 | Jang et al. |
| 2014/0078101 A1 | 3/2014 | Katsurahira |
| 2017/0003814 A1 | 1/2017 | Park |
| 2017/0090624 A1* | 3/2017 | Kwon ...................... G06F 3/044 |
| 2017/0153763 A1 | 6/2017 | Vavra et al. |
| 2017/0192591 A1* | 7/2017 | Jang ...................... G06F 3/0416 |
| 2017/0315655 A1* | 11/2017 | Weinerth ................ G06F 3/041 |
| 2018/0046272 A1 | 2/2018 | Hara et al. |
| 2018/0181229 A1 | 6/2018 | Kwon |

FOREIGN PATENT DOCUMENTS

| | | |
|---|---|---|
| KR | 10-1630047 | 6/2016 |
| KR | 10-2017-0046851 | 5/2017 |
| KR | 10-2017-0073749 | 6/2017 |

\* cited by examiner

TOUCH SCREEN CONTROLLER, TOUCH SCREEN SYSTEM INCLUDING THE TOUCH SCREEN CONTROLLER, AND METHOD OF OPERATING THE TOUCH SCREEN CONTROLLER

CROSS-REFERENCE TO RELATED APPLICATION

This application claims the benefit of Korean Patent Application No. 10-2017-0181518, filed on Dec. 27, 2017, in the Korean Intellectual Property Office, the disclosure of which is incorporated herein in its entirety by reference.

BACKGROUND

The inventive concept relates to a touch screen controller, and more particularly, to a touch screen controller that supports a plurality of types of touch sensing functions, a touch screen system including the touch screen controller, and a method of operating the touch screen controller.

Touch panels are being mounted on various electronic apparatuses. A touch panel may provide a region that can be touched by a finger of a user of an electronic apparatus and a pointer, such as a stylus pen, and may include a plurality of electrodes that provide sensing signals corresponding to occurrence or non-occurrence of a touch. A touch screen controller may detect occurrence or non-occurrence of a touch and a touch location by processing sensing signals provided by electrodes included in a touch panel.

However, to provide a function of sensing a finger touch and a pointer touch, a finger touch panel and a pointer touch panel are separately needed, and a finger touch screen controller and a pointer touch screen controller are also separately needed. In this case, the thickness of an electronic apparatus increases, or costs for providing a touch sensing function increase.

SUMMARY

The present disclosure provides a touch screen controller that reduces a size of an electronic apparatus employing the touch screen controller and has strong characteristics against noise, a touch screen system including the touch screen controller, and a method of operating the touch screen controller.

According to an aspect of the inventive concept, there is provided a touch screen controller including: a driving circuit configured to output a first driving signal in a first touch mode and a second driving signal in a second touch mode, the first touch mode including a driving period and a subsequent sensing period; and a boosting circuit configured, in the first touch mode, to generate a first voltage, by performing an internal switching operation based on an input voltage and a first switching signal, and configured to provide the first voltage to the driving circuit, wherein the first switching signal has a first frequency in the driving period and a second frequency different from the first frequency in the subsequent sensing period.

According to another aspect of the inventive concept, there is provided a touch screen controller including: a driving circuit configured to output a first driving signal to a touch panel in a pen touch mode including a driving period and a subsequent sensing period; a boosting circuit configured, in the pen touch mode, to generate a first voltage, by performing an internal switching operation based on an input voltage and a first switching signal, and configured to provide the first voltage to the driving circuit; a first analog front end circuit configured to receive a first sensing signal generated due to a pen touch in the subsequent sensing period of the pen touch mode and process the first sensing signal; and a control circuit configured to generate a control signal for controlling the internal switching operation of the boosting circuit, wherein the control circuit is configured to interrupt the internal switching operation in the subsequent sensing period.

According to another aspect of the inventive concept, there is provided a method of operating a touch screen controller, the method including: generating a first voltage by performing an internal switching operation based on a first, switching signal in a pen sensing mode including a driving period and a subsequent sensing period; providing a first driving signal generated according to the first voltage to a touch panel; generating a second voltage different from the first voltage by performing the internal switching operation based on a second switching signal, in a finger sensing mode; and providing a second driving signal generated according to the second voltage to the touch panel. The first switching signal has a first frequency during the driving period and a second frequency different from the first frequency during the subsequent sensing period. The second switching signal has a third frequency different from the first frequency.

BRIEF DESCRIPTION OF THE DRAWINGS

Embodiments of the inventive concept will be more clearly understood from the following detailed description taken in conjunction with the accompanying drawings in which.

DETAILED DESCRIPTION

Embodiments will now be described more fully with reference to the accompanying drawings.

Figure 1:
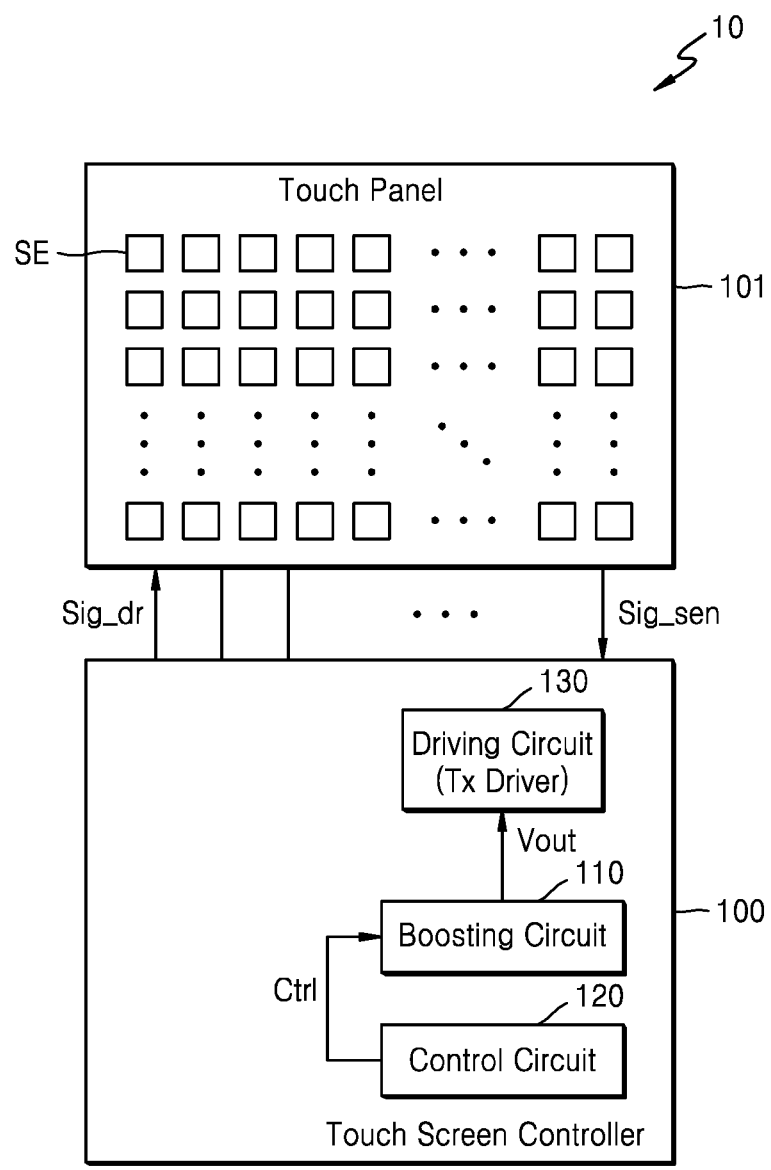
FIG. 1 is a block diagram of a touch screen system according to an embodiment of the inventive concept.

FIG. 1 is a block diagram of a touch screen system 10 according to an embodiment of the inventive concept.

Referring to FIG. 1, the touch screen system 10 may include a touch panel 101 and a touch screen controller 100. The touch panel 101 may include sensing electrodes SE for providing sensing signals generated by various touch sensing modes. For example, the sensing electrodes SE may provide a sensing signal based on an electrostatic (or capacitance) touch mode or provide a sensing signal based on a pressure touch mode. According to an embodiment, the sensing electrodes SE of the touch panel 101 may further provide a sensing signal corresponding to a touch by a pointer. For example, the sensing electrodes SE of the touch panel 101 may be commonly used in at least two touch sensing modes.

The touch screen system 10 may be mounted on various electronic apparatuses having a touch recognition function. For example, the touch screen system 10 may be mounted on an electronic apparatus, such as a personal computer (PC), a network server, a tablet PC, an e-reader, a personal digital assistant (PDA), a portable multimedia player (PMP), a mobile phone, a smartphone, a wearable device, an Internet of Things (IoT) device, a refrigerator, or a navigation device. The touch screen system 10 may also be mounted on an electronic apparatus that is included as a component in vehicles, furniture, manufacturing equipment, doors, various types of measuring apparatuses, and the like.

The sensing electrodes SE of the touch panel 101 may be formed of a transparent conductive material, such as indium tin oxide (ITO), indium zinc oxide (IZO), or indium tin zinc oxide (ITZO). For example, when the sensing electrodes SE provide a sensing signal based on a capacitance mode and a finger or a conductive object gets close to or contacts the touch panel 101, capacitance may be generated or changed between sensing electrodes SE and the conductive object at a location where a touch action has occurred. The touch screen controller 100 may apply a driving signal corresponding to an alternating current (AC) signal or a pulse signal to the sensing electrodes SE, and may analyze a sensing signal output by the touch panel 101 to thereby detect a variation in the capacitance caused by the touch action.

According to an embodiment, the touch panel 101 may be an in-cell type panel in which sensing electrodes SE are coupled with display pixels, and the plurality of sensing electrodes SE may include one of at least one element that constitute a display pixel, for example, a source driving line, a gate line, an anode pixel electrode, and a cathode pixel electrode. Alternatively, the plurality of sensing electrodes SE may be common electrodes to which a display common voltage VCOM is applied.

According to example embodiments, the touch panel 101 may be an on-cell type panel including sensing electrodes SE arranged on a display panel. Alternatively, the sensing electrodes SE may be formed on a substrate (or glass) separate from the display panel. The touch panel 101 may be implemented using a liquid crystal display (LCD), a light emitting diode (LED) display, an organic LED (OLED) display, an active-matrix OLED (AMOLED) display, or a flexible display, or may be implemented using any of other types of flat panel displays.

The touch screen system 10 may provide a pointer touch function using a touch pen or a stylus pen, and various modes supporting a touch recognition function by a pointer may be used. For example, in an Electro Magnetic Resonance (EMR) manner, a touch recognition function by a pointer may be supported using a special EMR-dedicated touch panel and a special EMR-dedicated controller chip. However, in this case, the size of an electronic apparatus employing the touch screen system 10 may increase, and costs for implementing the touch screen system 10 may increase.

According to an embodiment of the inventive concept, the touch screen system 10 may support a pointer touch recognition function based on an Electrical Coupled Resonance (ECR) manner. In this case, the sensing electrodes SE of the touch screen system 10 may be used in touch sensing by the conductive object, such as a finger, and may also be used in touch sensing by a pointer, and accordingly, a special touch panel for sensing a pointer touch does not need to be included. The touch screen controller 100 of FIG. 1 may process a sensing signal obtained by a conductive object, such as a finger, to thereby generate touch information, and also process a sensing signal obtained by a pointer to thereby generate touch information.

In embodiments below, the inventive concept will be described supposing that the sensing electrodes SE of the touch screen system 10 are used in a finger touch sensing mode (or finger touch mode) and a pen touch sensing mode (or pen touch mode). However, embodiments of the inventive concept are not limited thereto and are applicable to various touch sensing modes. Although a stylus pen and a touch pen have been mentioned as the types of pointers, pointers applicable to embodiments of the inventive concept may include various types of devices capable of providing a touch recognition function according to the aforementioned ECR manner.

According to an embodiment, the touch screen controller 100 may include a boosting circuit 110, a control circuit 120, and a driving circuit 130. The control circuit 120 may include a processor for controlling various types of components included in the touch screen controller 100, and may provide a control signal Ctrl for controlling the boosting circuit 110. As the boosting circuit 110 is included in the touch screen controller 100, the touch screen controller 100 may be implemented as a semiconductor device using a single semiconductor chip into which the boosting circuit 110 has been integrated.

As used herein, a semiconductor device may refer, for example, to a device such as a semiconductor chip (e.g., a memory chip and/or logic chip formed from a wafer), a stack of semiconductor chips, a semiconductor package including one or more semiconductor chips stacked on a package substrate, or a package-on-package device including a plurality of packages. An electronic device or an electronic apparatus, as used herein, may refer to one of these devices and may also include products that include these devices, such as a memory card, a memory module, a hard drive including additional components, a mobile phone, laptop, tablet, desktop, camera, server, computing system, or other consumer electronic device, etc.

The driving circuit 130 may provide a driving signal Sig_dr to the touch panel 101 connected to the driving circuit 120 via a plurality of channels. In touch sensing based on the ECR manner, as a driving signal Sig_dr having a relatively high voltage pulse is provided to the touch panel 101, an electric field E-field may be formed, and a position and sensitivity of a pointer may be sensed by resonance between the touch panel 101 and the pointer via the electric field E-field. The boosting circuit 110 may generate a boosting voltage Vout and provide the boosting voltage Vout to the driving circuit 130 in order to achieve the touch sensing based on the ECR manner, and the driving circuit 130 may generate the driving signal Sig_dr by using the boosting voltage Vout. For example, the boosting circuit 110 may generate the boosting voltage Vout by receiving an input voltage less than the boosting voltage Vout. For example, the boosting circuit 110 may generate a boosting voltage Vout having a greater level than a voltage level of a driving signal for touch sensing based on an existing capacitance manner. For example, the boosting voltage Vout may have a voltage level of 10V to 20V. The driving signal Sig_dr may be an AC or pulse signal having a low level (e.g., a ground voltage) and a high level (e.g., the boosting voltage Vout) as a swing width.

The boosting circuit 110 may generate the boosting voltage Vout, based on an internal switching operation. For example, the boosting circuit 110 may include a circuit block that accumulates current or energy, based on the internal switching operation, and a circuit block that generates a boosting voltage Vout corresponding to the energy accumulated based on the internal switching operation. According to an embodiment, the boosting voltage Vout generated by the boosting circuit 110 may be adjusted by a frequency and/or duty of the internal switching operation. The control circuit 120 may generate a control signal Ctrl for controlling the frequency of the internal switching operation of the boosting circuit 110.

The embodiments are described, and illustrated in the drawings, in terms of functional blocks, units and/or modules. These blocks, units and/or modules may be physically implemented by electronic (or optical) circuits such as logic circuits, discrete components, microprocessors, hard-wired circuits, memory elements, wiring connections, and the like, which may be formed together in a single integrated circuit (e.g., as a single semiconductor chip) or as separate integrated circuits and/or discrete components (e.g., several semiconductor chips wired together on a printed circuit board) using semiconductor fabrication techniques and/or other manufacturing technologies. These blocks, units and/or modules may be implemented by a processor (e.g., a microprocessor, a controller, a CPU, a GPU) or processors that are programmed using software (e.g., microcode) to perform various functions discussed herein. Each block, unit and/or module may be implemented by dedicated hardware, or as a combination of dedicated hardware to perform some functions and a processor to perform other functions. Also, each block, unit and/or module of the embodiments may be embodied by physically separate circuits and need not be formed as a single integrated.

As the boosting circuit 110 generates the boosting voltage Vout, based on the internal switching operation, switching noise due to the internal switching operation may act as noise upon a circuit block of the touch screen controller 100 and accordingly may reduce signal processing performance of the touch screen controller 100. For example, the touch screen controller 100 may include an analog front end (AFE) circuit that receives a sensing signal Sig_sen from the touch panel 101, and the switching noise due to the internal switching operation may act as noise upon signal processing in the AFE circuit.

According to an embodiment, the boosting circuit 110 may adjust the frequency (for example, a switching frequency) of the internal switching operation, in response to the control signal Ctrl. For example, noise generated while the sensing signal Sig_sen is being processed in the AFE circuit may greatly reduce a touch sensing sensitivity, and the boosting circuit 110 may adjust the frequency of the internal switching operation in order to reduce or remove noise generated while the sensing signal Sig_sen is being processed.

According to an embodiment, when various types of touch sensing modes are applied to the touch screen system 10, an electrostatic touch by a conductive object, such as a finger, will be referred to as a finger touch mode, and a touch by a pointer or the like will be referred to as a pen touch mode. Accordingly, the touch screen system 10 may operate in a finger sensing mode and in a pen sensing mode, and the control signal Ctrl may include information about touch sensing modes. The boosting circuit 110 may differently adjust the frequency of the internal switching operation in the pen sensing mode and in the finger sensing mode, based on the control signal Ctrl.

In the touch screen system 10, the sensing electrodes SE of the touch panel 101 may receive the driving signal Sig_dr or provide the sensing signal Sig_sen according to various touch modes. For example, the sensing electrodes SE of the touch panel 101 may be driven using a mutual sensing mode or a self sensing mode.

In the mutual sensing mode, some of the sensing electrodes SE of the touch panel 101 may be used as driving electrodes, and the others may be used as sensing electrodes. For example, the touch screen controller 100 may apply the driving signal Sig_dr to the driving electrodes and receive the sensing signal Sig_sen from the sensing electrodes.

In the self sensing mode, each of the sensing electrodes SE may be used as a driving electrode and a sensing electrode. The touch screen controller 100 may apply the driving signal Sig_dr to a sensing electrode and receive the sensing signal Sig_sen from the sensing electrode.

According to an embodiment, in the pen sensing mode, the touch panel 101 may be driven according to the self sensing mode. Accordingly, the pen sensing mode may include a driving period for providing the driving signal Sig_dr and a sensing period for receiving and processing the sensing signal Sig_sen, and the boosting circuit 110 may differently adjust the frequency of the internal switching operation in the driving period and the sensing period of the pen sensing mode. For example, in the driving period of the pen sensing mode, an influence of noise in the AFE circuit is small, and accordingly, the boosting circuit 110 may set the frequency of the internal switching operation to be relatively large. On the other hand, in the sensing period of the pen sensing mode, an influence of noise in the AFE circuit is large, and accordingly, the boosting circuit 110 may set the frequency of the internal switching operation to be smaller than that in the driving period. According to an embodiment, in the sensing period of the pen sensing mode, the boosting circuit 110 may interrupt the internal switching operation.

In the finger sensing mode, the touch panel 101 may be driven according to the mutual sensing mode, and accordingly, in the finger sensing mode, the driving period may not be distinguished from the sensing period. In this case, in the finger sensing mode, the boosting circuit 110 may set the frequency of the internal switching operation to be small, in order to reduce or remove noise in the AFE circuit. For example, the boosting circuit 110 may perform the internal switching operation as a second frequency that is less than a frequency (for example, a first frequency) in the driving period of the pen sensing mode. A frequency band of a switching noise component changes as the frequency of the internal switching operation decreases, and the frequency band of the switching noise component may be located outside a pass band of a band selection circuit (for example, a filter) that may be included in the AFE circuit. Accordingly, even when the driving signal Sig_dr corresponding to the boosting voltage Vout is provided to the touch panel 101 in the finger sensing mode, stable touch sensing may be performed without reducing touch sensitivity.

In the above-described embodiment, the touch panel 101 is driven according to the self sensing mode in the pen sensing mode and is driven according to the mutual sensing mode in the finger sensing mode. However, embodiments are not limited thereto. For example, in the pen sensing mode and the finger sensing mode, the touch panel 101 may be driven according to the same mode. As another example, in the pen sensing mode, the touch panel 101 may be driven according to the mutual sensing mode, and, in the finger sensing mode, the touch panel 101 may be driven according to the self sensing mode.

Although not shown in FIG. 1, the touch screen controller 100 may further include a signal processor (not shown) that receives a signal processing result from the AFE circuit and generates touch information. For example, as an analog-to-digital converter (ADC) is included in the AFE circuit, a digital signal processor (DSP) may generate touch information by using a signal processing result from the AFE circuit.

According to such an embodiment of the inventive concept, the single touch panel 101 may be used to perform finger touch sensing and pen touch sensing, and touch information associated with the finger touch sensing and the pen touch sensing may be generated by using the single touch screen controller 100, and thus a size and implementation costs of the touch screen system 10 may be reduced. Moreover, because the boosting circuit 110 is integrated with the touch screen controller 100, a special semiconductor chip for a boosting function does not need to be further included. In addition, by controlling the internal switching operation according to the above-described embodiment, a decrease in sensitivity of the touch sensing may be prevented.

Figure 2:
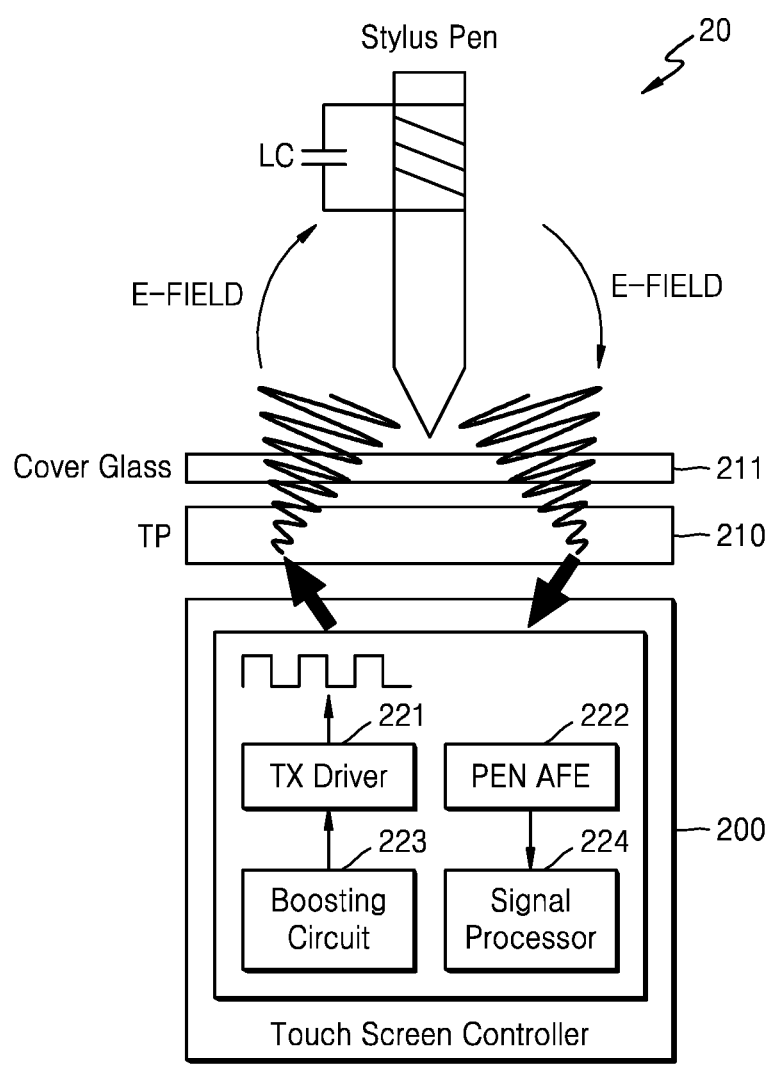
FIG. 2 is a schematic diagram illustrating an operation principle of touch sensing according to an electrical coupled resonance (ECR) manner according to example embodiments.

FIG. 2 is a schematic diagram illustrating an operation principle of touch sensing according to the ECR manner according to example embodiments.

Referring to FIG. 2, a touch screen system 20 may include a touch panel (TP) 210 and a touch screen controller 200. FIG. 2 further illustrates a cover glass 211 positioned on the TP 210. The TP 210 may include a plurality of sensing electrodes according to the above-described embodiment, and the sensing electrodes may be commonly used for finger sensing mode and pen sensing mode.

The touch screen controller 200 may include a driving circuit 221, an AFE circuit 222, a boosting circuit 223, and a signal processor 224. The driving circuit 221 may receive a boosting voltage from the boosting circuit 223 according to the above-described embodiment and may provide a pulse signal having a level corresponding to the boosting voltage as a driving signal to the TP 210. The AFE circuit 222 may receive a sensing signal from the TP 210 and provide a result of processing the sensing signal to the signal processor 224, and the signal processor 224 may generate touch information, based on the received result of the processing.

In touch sensing based on the ECR manner, a pointer, such as a stylus pen, and the TP 210 provoke resonance via an electric field E-field, and accordingly, a position and sensitivity of the pointer may be sensed. For example, a driving signal provided to the sensing electrodes of the TP 210 may be provided to the pointer via capacitive coupling, and the sensing electrodes of the TP 210 may receive a sensing signal via capacitive coupling with the pointer. To this end, the pointer may include a resonance circuit LC and may obtain energy necessary for resonance, based on the driving signal corresponding to the boosting voltage, and the sensing electrodes of the TP 210 may receive a resonance signal generated by the pointer, as the sensing signal, and may provide the received resonance signal to the touch screen controller 200.

In the above-described ECR manner, a strong electric field E-field needs to be formed in order to obtain a high signal-to-noise ratio (SNR). To this end, the touch screen controller 200 may include the boosting circuit 223 that generates the boosting voltage.

The boosting circuit 223 may be implemented using a boost-type direct current (DC)-to-DC converter, and the DC-to-DC converter may generate the boosting voltage, based on an internal switching operation. As the driving signal corresponding to the boosting voltage is provided to the TP 210, an electric field E-field may be formed between the touch panel 210 and the pointer. According to an embodiment, the boosting circuit 223 may also be used to generate a driving signal for finger touch sensing, and, as a driving signal having a boosting voltage is generated, an SNR may also be increased even in finger touch sensing.

In this case, the boosting circuit 223 implemented using a DC-to-DC converter is integrated into the touch screen controller 200, and the DC-to-DC converter regulates a voltage according to the internal switching operation and accordingly generates switching noise. As described above, the switching noise may act as noise upon the AFE circuit 222 that provides a result of processing the sensing signal to the signal processor 224. However, according to an embodiment of the inventive concept, the noise may be reduced or removed by differently controlling a frequency for an internal switching operation according to different touch sensing modes.

Embodiments of the inventive concept will now be described supposing that a boosting circuit corresponds to a DC-to-DC converter.

Figure 3:
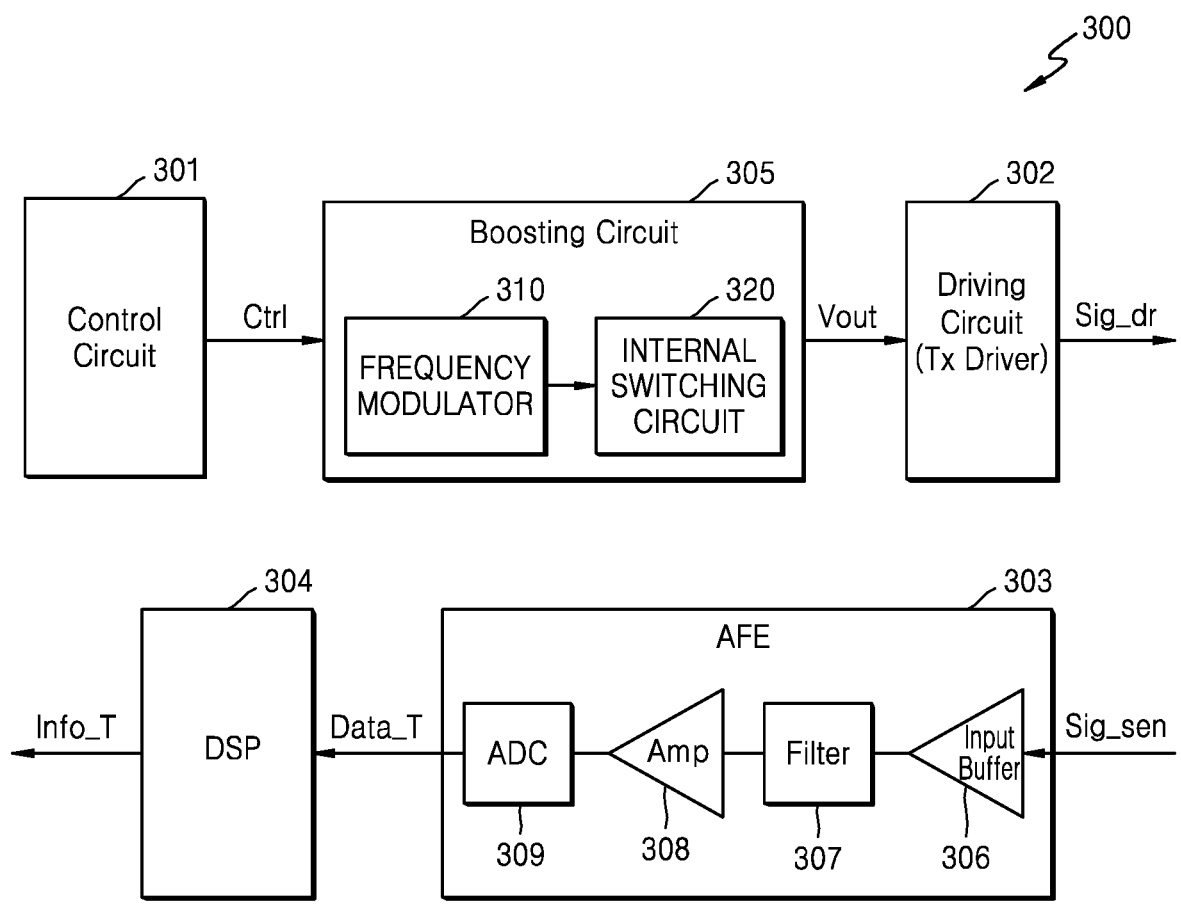
FIG. 3 is a block diagram illustrating an operation of a touch screen controller according to example embodiments.

FIG. 3 is a block diagram illustrating an operation of a touch screen controller of FIGS. 1 and 2 according to example embodiments.

Referring to FIG. 3, the touch screen controller 300 may include a control circuit 301, a DC-to-DC converter 305 as a boosting circuit, a driving circuit 302, an AFE circuit 303, and a DSP 304. According to an embodiment, for example, the driving circuit 302 commonly provides the driving signal Sig_dr in the pen sensing mode and in the finger sensing mode and the AFE circuit 303 commonly receives the sensing signal Sig_sen in the pen sensing mode and in the finger sensing mode.

The control circuit 301 may generate the control signal Ctrl according to the above-described embodiments, and the DC-to-DC converter 305 may adjust an internal switching operation, based on the control signal Ctrl. For example, the boosting circuit 305 may include a frequency modulator 310 and an internal switching circuit 320, wherein the frequency modulator 310 may generate a switching signal having a certain frequency and the internal switching circuit 320 may perform an internal switching operation in response to the switching signal. The frequency modulator 310 may perform a frequency modulation operation in response to the control signal Ctrl, and accordingly, switching signals having different frequencies may be generated according to different touch sensing modes. A boosting voltage Vout generated based on the internal switching operation may be provided to the driving circuit 302.

The sensing signal Sig_sen from a TP may be provided to the AFE circuit 303, and the AFE circuit 303 may include an input buffer 306, a filter 307, an amplifier 308, and an ADC

309. According to an embodiment, the driving circuit 302 may be defined as a component that is included in the AFE circuit 303.

The input buffer 306 may perform an operation of receiving the sensing signal Sig_sen. For example, the input buffer 306 may receive a sensing signal Sig_sen corresponding to a current signal and generate an output signal corresponding to a voltage signal. The filter 307 may reduce a frequency band caused by noise from among frequency bands of the sensing signal Sig_sen. For example, the filter may have a pass band and a stop band by having at least one cutoff frequency as a boundary, and the sensing signal Sig_sen may have a frequency band caused by a touch and a frequency band caused by a noise, the two frequency bands being different from each other. As the pass band of the filter includes the frequency band caused by a touch, the frequency band caused by a noise from among the frequency bands of the sensing signal Sig_sen may be reduced or removed.

The amplifier 308 may generate an analog amplification signal by amplifying the output signal of the filter 307, and the ADC 309 may generate touch data Data_T via the ADC 309 on the analog amplification signal from the amplifier 308. The DSP 304 may generate touch information Info_T by processing the touch data Data_T.

Figure 4:
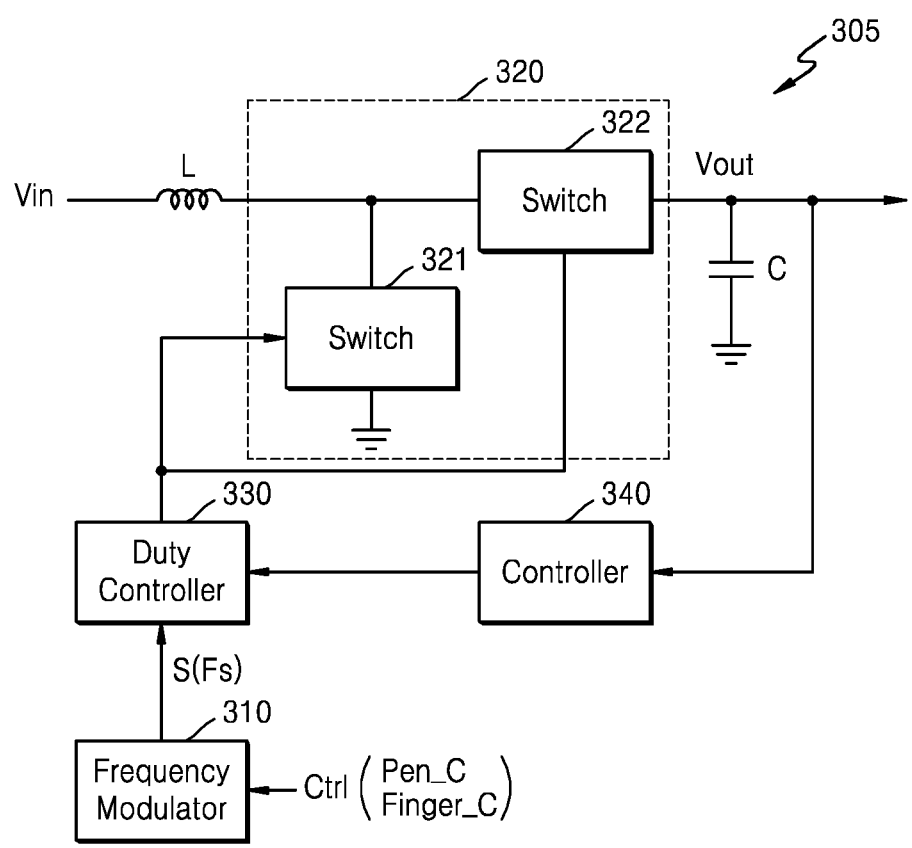
FIG. 4 is a block diagram of an embodiment of a boosting circuit of FIGS. 1 and 2 according to example embodiments.

FIG. 4 is a block diagram of an embodiment of a boosting circuit of FIGS. 1 and 2 according to example embodiments.

Referring to FIGS. 3 and 4, the DC-to-DC converter 305 as a boosting circuit may include the frequency modulator 310, the internal switching circuit 320, a duty controller 330, and a controller 340. The internal switching circuit 320 includes at least one switch, for example, a first switch 321 and a second switch 322.

The frequency modulator 310 may receive a control signal Ctrl having information related to the touch sensing modes, and may generate a switching signal S, based on the received control signal Ctrl. For example, the control signal Ctrl may include a pen mode control signal Pen_C for an operation in the pen touch mode, and a finger mode control signal Finger_C for an operation in the finger touch mode. The frequency modulator 310 may modulate a frequency Fs of the switching signal S, based on the control signal Ctrl. In example embodiments, the frequency Fs of the switching signal S may be modulated to a first frequency that is relatively large, to a second frequency that is relatively small, or to 0. In some example, the frequency modulator 310 may generate a first switching signal S1 in The duty controller 330 may receive the switching signal S, adjust the duty of the switching signal S, and generate a duty-adjusted switching signal. The first switch 321 and the second switch 322 may be controlled to be switched, in response to the duty-adjusted switching signal. The boosting voltage Vout as an output of the DC-to-DC converter 305 is fed back to the controller 340. The controller 340 may adjust the duty of the duty generator 330 by comparing the level of the boosting voltage Vout with a target voltage level. For example, the level of the boosting voltage Vout may be increased or decreased according to a duty ratio of the switching signal S, and the level of the boosting voltage Vout may remain at the target voltage level under the control of the controller 340.

The DC-to-DC converter 305 may receive an input voltage Vin and boost the received input voltage Vin to thereby generate the boosting voltage Vout. The input voltage Vin may correspond to a voltage inside or outside the touch screen controller 300. For example, the input voltage Vin may be a voltage provided from the outside of the touch screen controller 300. In some examples, the input voltage Vin may be provided from an internal voltage generator (not shown) included in the touch screen controller 300. In some examples, the input voltage Vin may be provided as a power supply voltage to internal circuits such as the control circuit 301, the AFE circuit 303, the DSP 304, etc. The DC-to-DC converter 305 may include a plurality of circuits for performing boosting. As shown in FIG. 4, the DC-to-DC converter 305 may include electric components, such as an inductor L and a capacitor C.

For example, the first switch 321 and the second switch 322 may be controlled to be turned on/off complementarily to each other. When the first switch 321 is in an on state, current or energy may be accumulated via the inductor L based on the input voltage Vin, and, when the second switch 322 is in an on state, a boosting voltage Vout corresponding to the accumulated energy may be generated. The capacitor C may be arranged to stabilize the level of the boosting voltage Vout, and the boosting voltage Vout may be charged in the capacitor C. According to embodiments of the inventive concept, switching operation characteristics of the first and second switches 321 and 322 related with generation of the boosting voltage Vout may vary depending on a touch sensing mode.

Figure 5A:
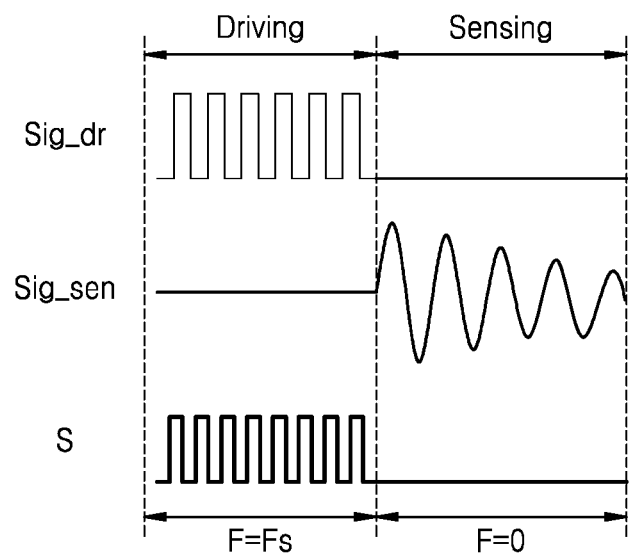
FIGS. 5A, 5B, and 6 are waveforms illustrating an example of controlling an internal switching operation based on a touch sensing mode according to example embodiments.
Figure 5B:
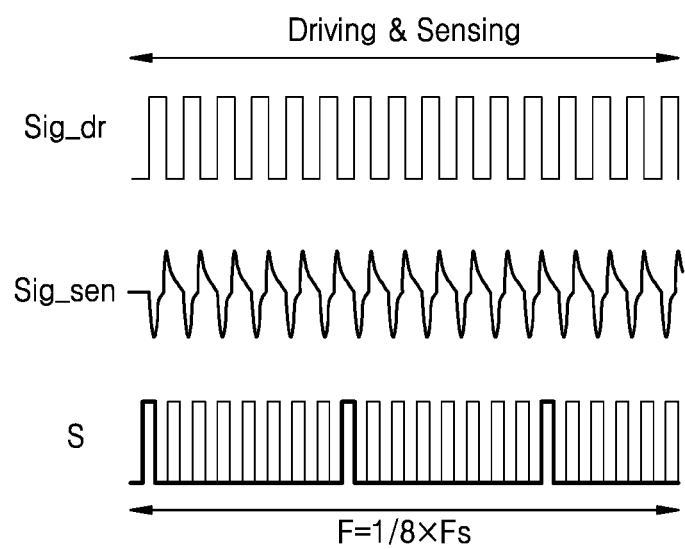
Figure 6:
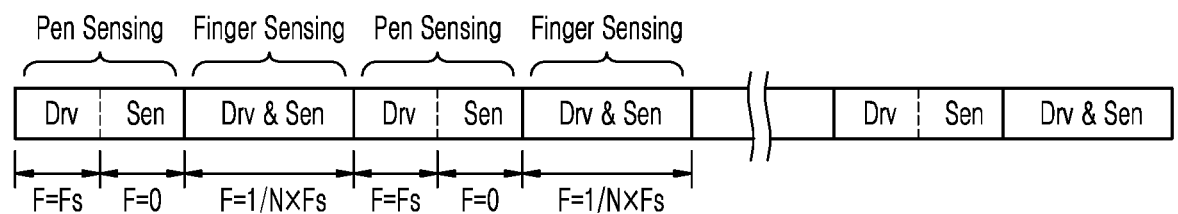

FIGS. 5A, 5B, and 6 are waveforms illustrating an example of controlling an internal switching operation based on a touch sensing mode according to example embodiments. FIGS. 5A and 5B illustrate an example of controlling an internal switching operation in the pen sensing mode, and FIG. 6 illustrates an example of controlling an internal switching operation in the finger sensing mode. According to an embodiment of the inventive concept, for example, in the pen sensing mode, a TP is driven according to the self sensing mode, and, in the finger sensing mode, the TP is driven according to the mutual sensing mode.

Referring to FIG. 1 and FIG. 5A, because the TP 101 is driven using the self sensing mode in the pen sensing mode, the pen sensing mode may include a driving period for providing the driving signal Sig_dr to the sensing electrodes SE of the TP 101, and a sensing period for processing the sensing signal Sig_sen. In other words, in the pen sensing mode, the driving period and the sensing period may be temporally distinguished from each other.

In example embodiments, an amount of the driving period for providing the driving signal Sig_dr may be the same as an amount of the sensing period for processing the sensing signal Sig_sen.

A DC-to-DC converter may perform an internal switching operation according to a switching signal having a switching frequency F, and, in the driving period of the pen sensing mode, the frequency F of the switching signal may correspond to a first frequency Fs having a certain value. In other words, in the driving period of the pen sensing mode, a boosting voltage may be generated via an internal switching operation according to the switching signal having the first frequency Fs. A driving signal Sig_dr having a pulse corresponding to the generated boosting voltage may be generated and provided to the TP 101.

A period in which switching noise of the DC-to-DC converter has a large influence may correspond to a sensing period in which an AFE circuit processes the sensing signal Sig_sen, and accordingly, as shown in FIG. 5A, the switching frequency F of the switching signal may be modulated to 0 in the sensing period of the pen sensing mode. In other words, because the internal switching operation is not performed in the sensing period of the pen sensing mode, the switching noise may be removed. Because the internal switching operation is interrupted in the sensing period of the pen sensing mode but a driving signal using energy inside the DC-to-DC converter is not generated in the sensing period, the DC-to-DC converter may quickly generate and provide a boosting voltage in a next driving period.

In some examples, the frequency modulator 310 may generate a first switching signal S1 in the pen touch mode. The first switching signal S1 may have a first frequency Fs in the driving period of the pen touch mode. The first switching signal S1 may also have a frequency 0 or less than the first frequency Fs in the sensing period of the pen touch mode.

Referring to FIG. 5B, in the finger sensing mode, the TP 101 may be driven according to the mutual sensing mode, and accordingly, in the finger sensing mode, the driving period and the sensing period are not temporally separated from each other. For example, in the finger sensing mode, the driving signal Sig_dr may be provided to the sensing electrodes SE of the TP 101, and the sensing signal Sig_sen may be received from the sensing electrodes SE and then processed.

Accordingly, the internal switching operation may be controlled in the finger sensing mode according to a different frequency modulation mode from that in the pen sensing mode. According to an embodiment, in the finger sensing mode, the switching frequency F of the switching signal may be modulated to become less than the first frequency Fs in the driving period of the pen sensing mode. For example, FIG. 5B illustrates an example in which the switching frequency F of the switching signal is modulated by being divided or down-scaled, and illustrates a case where the switching frequency F of the switching signal in the finger sensing mode has a value corresponding to ⅛ of the frequency Fs in the driving period of the pen sensing mode.

According to the embodiment of FIG. 5B, the frequency of switching noise caused by the internal switching operation of the DC-to-DC converter may be located outside a frequency band of a signal that is processed within an AFE circuit (or outside a pass band of a filter of the AFE circuit), and accordingly, an influence of the switching noise generated in the DC-to-DC converter may be removed or reduced.

In some embodiments, the frequency modulator 310 may generate a second switching signal S2 in the finger touch mode. The second switching signal S2 may have a second frequency less than the first frequency Fs of the first switching signal S1. For example, the switching frequency F of the switching signal in the finger touch mode may have a value obtained by dividing the first frequency Fs by N, where N is an integer equal to or greater than 2.

FIG. 6 illustrates an example of an internal switching operation of the DC-to-DC converter when the pen sensing mode and the finger sensing mode are periodically repeated. In the example of FIG. 6, a period of one pen sensing mode and a period of one finger sensing mode may constitute a single touch sensing cycle. In other words, the single touch sensing cycle may include a driving period of the pen sensing mode, a sensing period thereof, and a finger sensing mode.

In example embodiments, the internal switching operation of the DC-to-DC converter may be repeatedly controlled at the touch sensing cycle of FIG. 6, and the control circuit may provide information representing the touch sensing mode and the periods to the DC-to-DC converter. The DC-to-DC converter may include a frequency modulator for controlling an internal switching operation, and may perform a frequency modulation operation according to the information received from the control circuit. Referring to FIG. 6, the switching frequency F of the switching signal in the driving period of the pen sensing mode may have the first frequency Fs, the switching frequency F of the switching signal in the sensing period of the pen sensing mode may correspond to 0 or less than the first frequency Fs, and the switching frequency F of the switching signal in the finger sensing mode may have a second frequency of 1/N*Fs, where N is a natural number equal to or greater than 2.

In example embodiments, the control circuit may provide a switching signal directly to the DC-to-DC converter. In this case, the DC-to-DC converter may directly receive a frequency-modulated switching signal from the control circuit. In other words, a touch screen controller may be implemented such that the control circuit provides the DC-to-DC converter with a switching signal of which a frequency is modulated according to a touch sensing mode and periods thereof.

Figure 7:
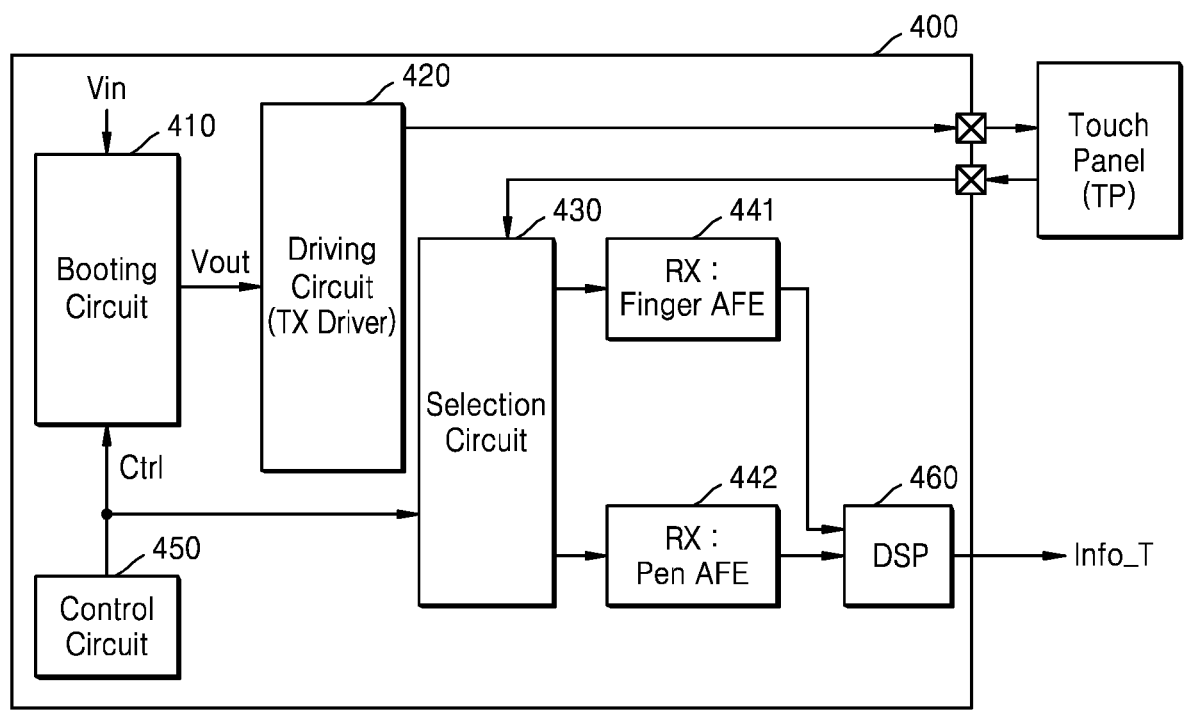
FIG. 7 is a block diagram of a touch screen controller including a boosting circuit, according to an embodiment of the inventive concept.

FIG. 7 is a block diagram of a touch screen controller 400 including a boosting circuit 410, according to an embodiment of the inventive concept.

Referring to FIG. 7, the touch screen controller 400 may include the boosting circuit 410, a driving circuit 420, a selection circuit 430, first and second AFE circuits 441 and 442, a control circuit 450, and a DSP 460. Although not shown in FIG. 7, the touch screen controller 400 may further include various other components for touch sensing. The driving circuit 420, the selection circuit 430, and the first and second AFE circuits 441 and 442 of FIG. 7 may be defined as a single AFE circuit.

The boosting circuit 410 may include a DC-to-DC converter, and, according to the above-described embodiments, may generate the boosting voltage Vout, based on the internal switching operation, and provide the boosting voltage Vout to the driving circuit 420. The driving circuit 420 may generate a pulse signal having a level corresponding to the boosting voltage Vout as a driving signal and may provide the driving signal to a TP.

The first and second AFE circuits 441 and 442 may be included in correspondence with a plurality of touch sensing modes, wherein the first AFE circuit 441 may include components that process a sensing signal related to finger touch sensing mode and the second AFE circuit 442 may include components that process a sensing signal related to pen touch sensing mode. Because sensing electrodes of the TP are commonly used in the finger touch sensing and the pen touch sensing, the selection circuit 430 may provide sensing signals from the TP to either the first AFE circuit 441 or the second AFE circuit 442 in response to a control signal Ctrl from the control circuit 450.

The control circuit 450 may control an overall internal operation of the touch screen controller 400, and, according to the above-described embodiment, may generate the control signal Ctrl for controlling an internal switching operation of the boosting circuit 410. The boosting circuit 410 may modulate the frequency of a switching signal in response to the control signal Ctrl, and may control the internal switching operation according to a frequency-modulated switching signal. According to the above-described embodiment, the control signal Ctrl may include information related to the touch sensing mode, and the boosting circuit 410 may perform an internal switching operation by using a switching signal that is differently modulated according to a touch sensing mode.

According to an embodiment, the first and second AFE circuits 441 and 442 may respectively include ADCs, and may respectively provide digital signals as results of processing the sensing signals to the DSP 460. The DSP 460 may process the received digital signals to output touch information Info_T representing occurrence or non-occurrence of touches by a finger and a pen and touch locations.

Figure 8:
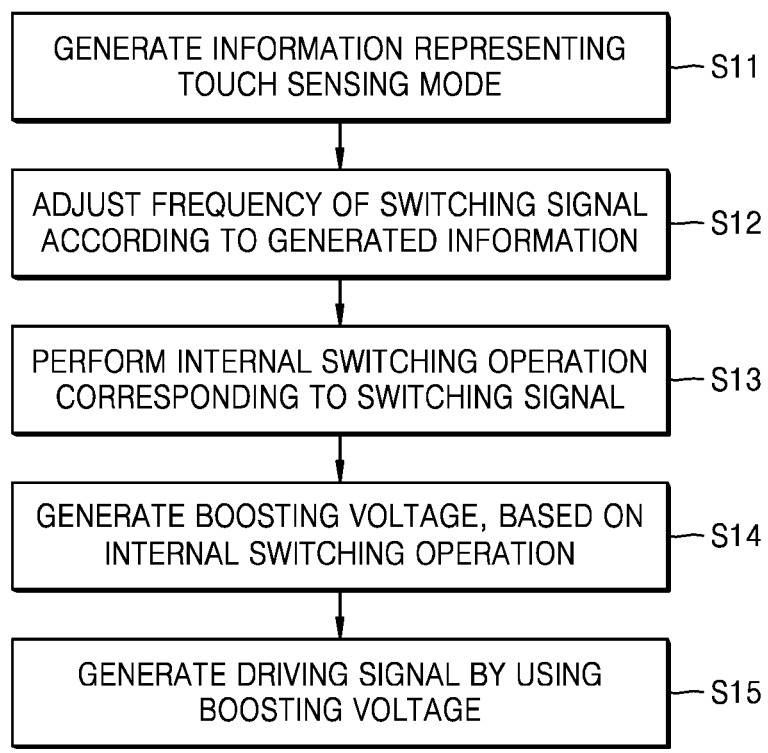
FIGS. 8 and 9 are flowcharts of methods of operating a touch screen controller, according to example embodiments of the inventive concept.
Figure 9:
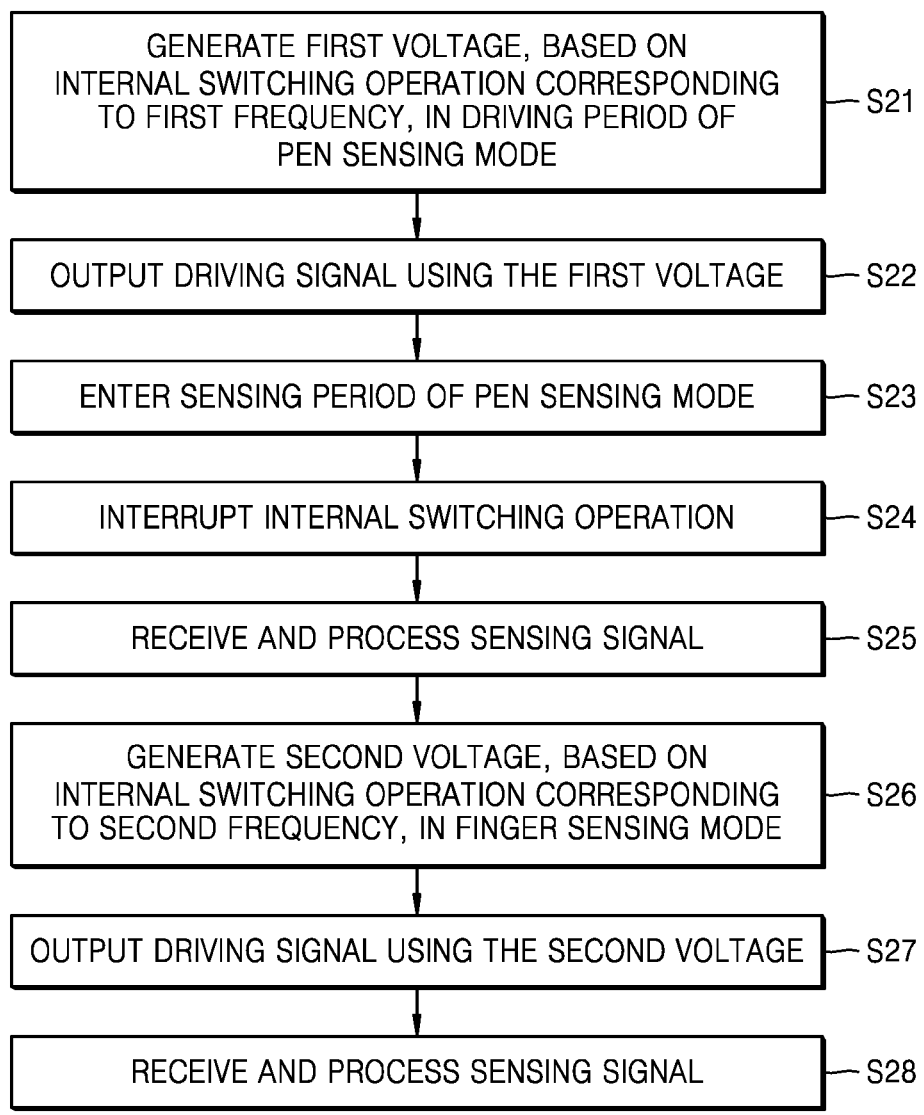

FIGS. 8 and 9 are flowcharts of methods of operating a touch screen controller, according to example embodiments of the inventive concept.

Referring to FIG. 8, the touch screen controller may drive a TP and process a sensing signal according to various types of touch sensing modes, and may generate information representing a touch sensing mode, in operation S11. The generated information may be used in the touch screen controller. For example, the touch screen controller may include a boosting circuit that generates a boosting voltage, based on an internal switching operation, in order to support a touch recognition function by a pointer (or a touch pen) according to the ECR manner, and the internal switching operation may be controlled according to a switching signal within the touch screen controller. In operation S12, a frequency of the switching signal may be adjusted according to the generated information.

A switching signal of which a frequency is adjusted according to a touch sensing mode may be generated, and, in operation S13, an internal switching operation corresponding to the switching signal may be performed. In operation S14, a boosting voltage may be generated based on the internal switching operation. In operation S15, a driving signal may be generated using the boosting voltage. The generated driving signal may be provided to an external TP.

FIG. 9 illustrates an example in which frequencies of internal switching operations in the pen sensing mode and the finger sensing mode are adjusted. Referring to FIG. 9, the pen sensing mode is temporally divided into a driving period and a sensing period, and, in the driving period of the pen sensing mode, a first voltage is generated based on an internal switching operation corresponding to a first frequency, in operation S21. In operation S22, a driving signal generated using the first voltage may be output to a TP.

Thereafter, as the touch screen controller enters the sensing period of the pen sensing mode in operation S23, the touch screen controller may interrupt the internal switching operation, in operation S24. In operation S25, when noise due to the internal switching operation has been reduced or removed, the touch screen controller may receive a sensing signal generated by a pen touch from the TP and process the received sensing signal.

Thereafter, as the finger sensing mode is entered, an operation of driving sensing electrodes of the TP and an operation of processing sensing signals may be performed together during one sensing cycle. In operation S26, to reduce noise caused by the internal switching operation, a second voltage may be generated based on an internal switching operation corresponding to a second frequency in the finger sensing mode. In some examples, the boosting circuit may generate the second voltage equal to or greater than the input voltage Vin. In operation S27, a driving signal generated using the second voltage may be output to the TP. In operation S28, the touch screen controller may receive a sensing signal generated by a finger touch from the TP and process the received sensing signal.

Figure 10:
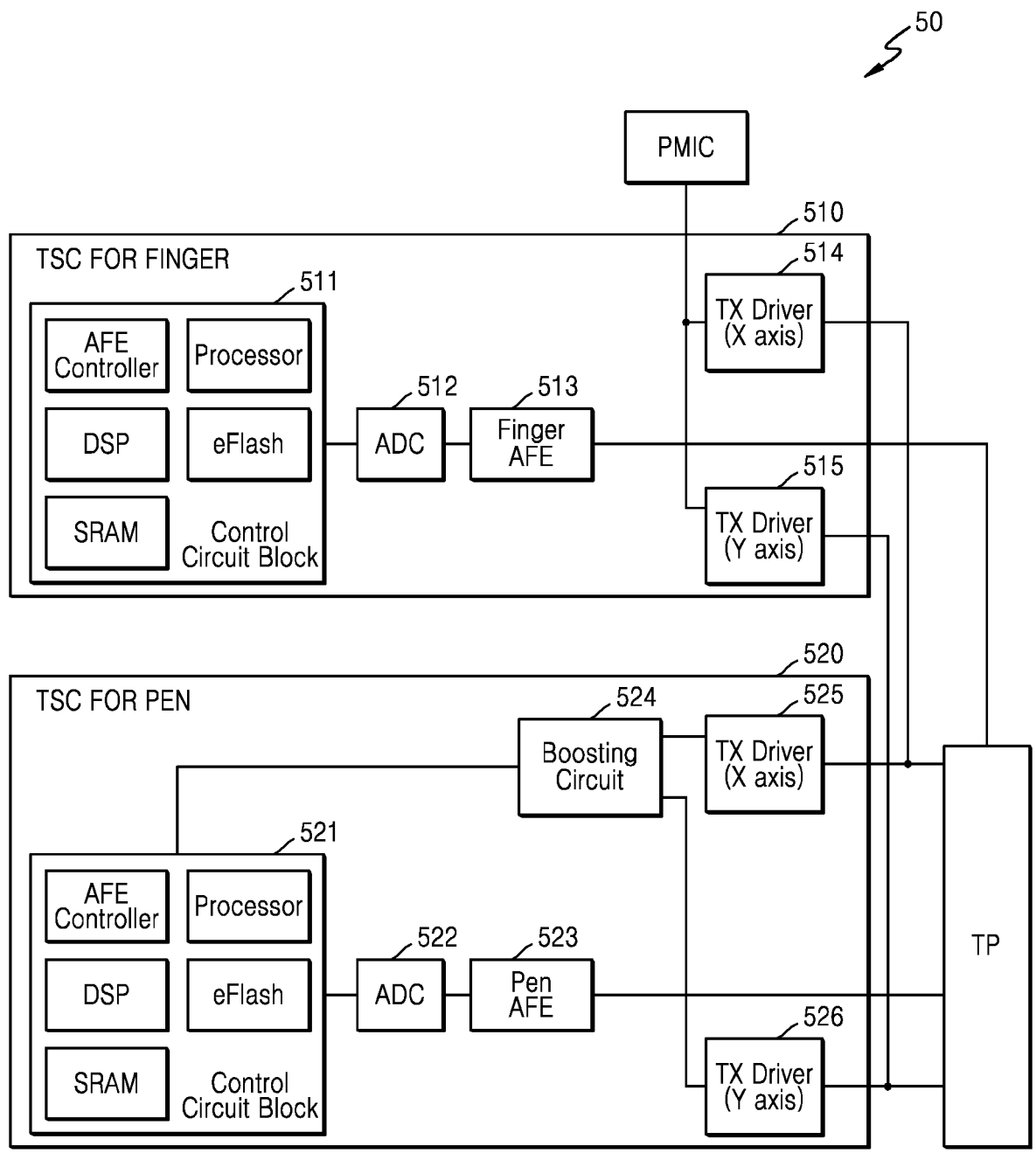
FIGS. 10 through 12 are block diagrams of touch screen systems according to example embodiments of the inventive concept.
Figure 11:
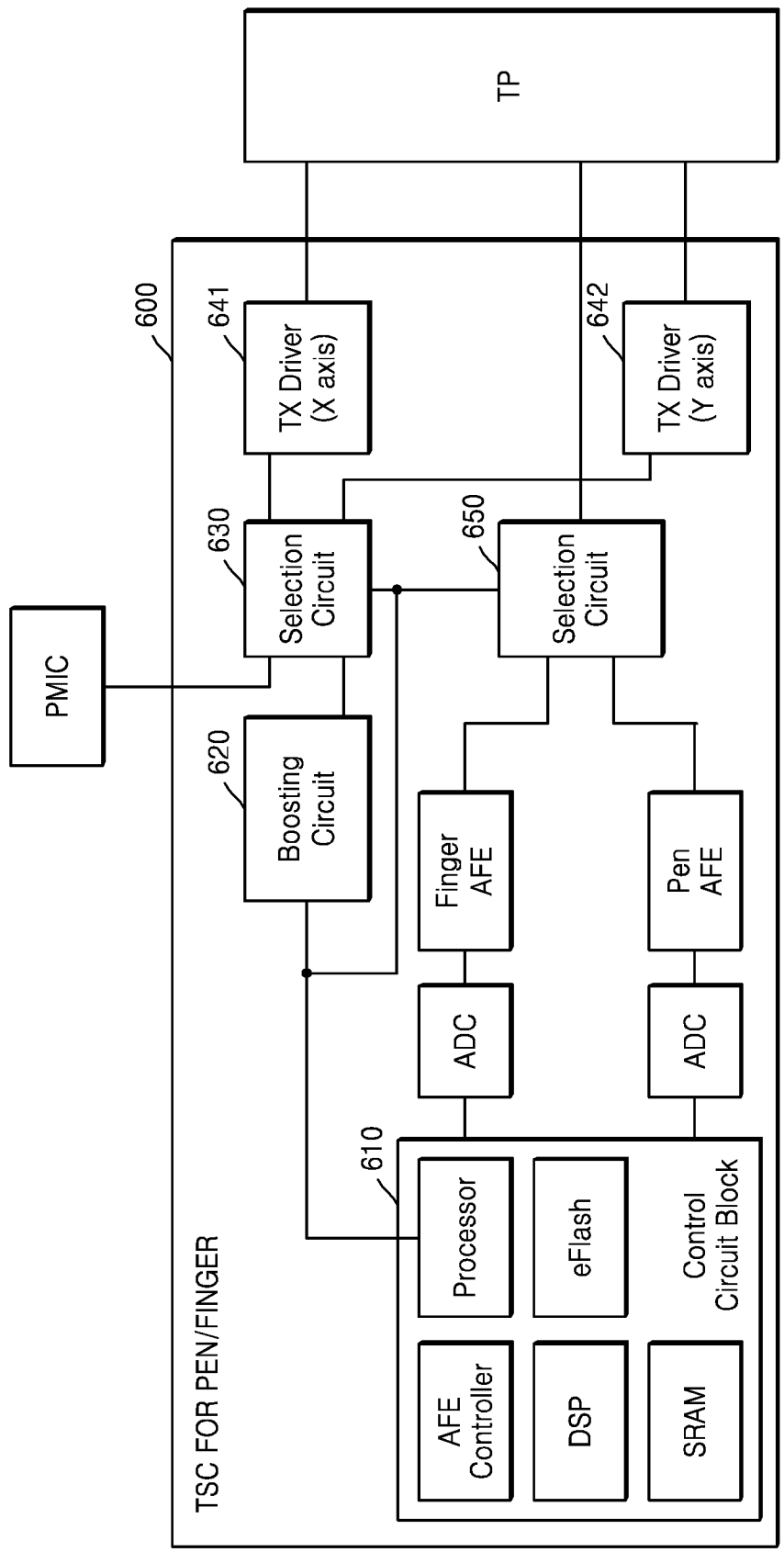
Figure 12:
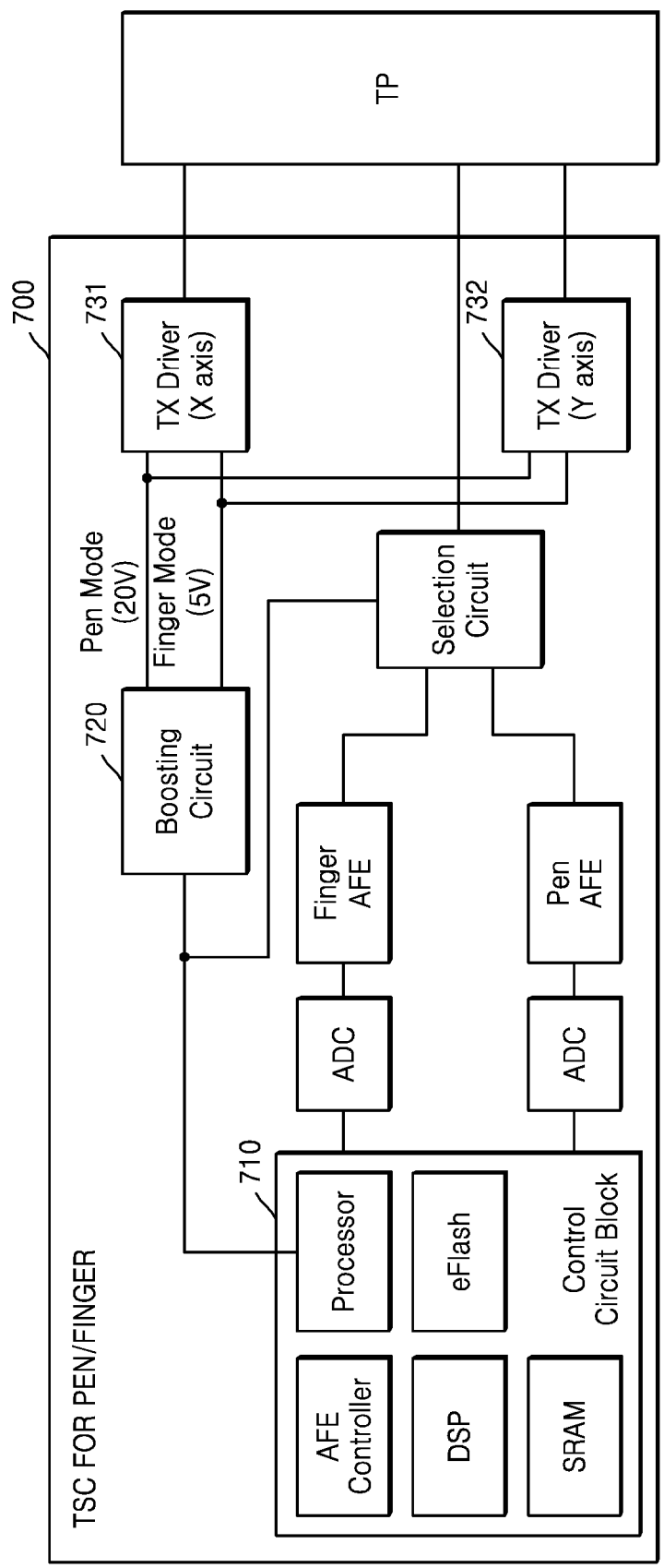

FIGS. 10 through 12 are block diagrams of touch screen systems according to example embodiments of the inventive concept.

Referring to FIG. 10, to support a finger sensing function and a pen sensing function, a TP including sensing electrodes may be commonly used in the finger sensing mode and in the pen sensing mode. In an embodiment, touch screen controllers for use in the finger sensing mode and the pen sensing mode may be implemented using independent semiconductor chips.

In an embodiment, a touch screen system 50 may include a first touch screen controller 510, a second touch screen controller 520, a power management integrated circuit (PMIC) (or a voltage generator), and a TP. The first touch screen controller 510 may perform a function for finger sensing, and the second touch screen controller 520 may perform a function for pen sensing. The first touch screen controller 510 may include a control circuit block 511, an ADC 512, a finger AFE circuit 513, a horizontal driving circuit 514, and a vertical driving circuit 515. The second touch screen controller 520 may include a control circuit block 521, an ADC 522, a pen AFE circuit 523, a boosting circuit 524, a horizontal driving circuit 525, and a vertical driving circuit 526.

An operation of the touch screen system 50 of FIG. 10 will now be described. In embodiments below, an example in which, as the sensing electrodes of the TP are connected to the first and second touch screen controllers 510 and 520 via horizontal channels and vertical channels, the horizontal driving circuit and the vertical driving circuit are included in each semiconductor chip is illustrated. However, this is merely an embodiment, and thus touch screen controllers according embodiments of the inventive concept may be implemented in various other forms.

Each of the control circuit blocks 511 and 521 for entirely controlling the inside of a semiconductor chip is disclosed, and each of the control circuit blocks 511 and 521 may include a processor as a component that performs a function of the control circuit according to the above-described embodiments. Each of the control circuit blocks 511 and 521 is illustrated as further including an AFE controller, a DSP, and memories (eFlash and SRAM). However, this is merely an embodiment, and thus touch screen controllers according embodiments of the inventive concept may be implemented in various other forms. For example, the DSP and the memories (eFlash and SRAM) may be defined as components mounted outside each of the control circuit blocks 511 and 521.

In the finger sensing mode, the first touch screen controller 510 may provide a driving signal to the TP via driving circuits 514 and 515. According to an embodiment, a voltage necessary for generating the driving signal may be provided from the external PMIC to the first touch screen controller 510. A level of the voltage from the external PMIC may be less than that of the boosting voltage from the boosting circuit according to the above-described embodiments. In some examples, the touch screen controller 510 may include an internal voltage generator instead of the external PMIC.

In the finger touch mode, a sensing signal may be provided to a control circuit block 511 via the finger AFE circuit 513 and the ADC 512. In the control circuit block 511, the DSP may generate touch information by using a result of processing the sensing signal and the memories (eFlash and SRAM) may store various types of information for touch sensing processing, or may temporarily store the result of processing the sensing signal.

In the pen sensing mode, the second touch screen controller 520 may provide a driving signal to the TP via driving circuits 525 and 526 according to the above-described embodiments. For example, the driving signal may be generated using a boosting voltage generated by a boosting circuit 524. In the pen touch mode, a sensing signal may be provided to the control circuit block 521 via the pen AFE circuit 523 and the ADC 522. The boosting circuit 524 of the second touch screen controller 520 may perform an internal switching operation according to the above-described embodiments, and a switching frequency may be differently modulated in the driving period and the sensing period of the pen sensing mode.

In example embodiments, referring to FIG. 11, a touch screen controller 600 may be commonly used in the pen sensing mode and the finger sensing mode, and accordingly, may include components for supporting a pen sensing function and a finger sensing function. The touch screen controller 600 may perform a voltage boosting function for the pen sensing mode according to the above-described embodiment. When operations of the components shown in FIG. 11 are described, a description of FIG. 11 that is the same as given above with reference to the above-described embodiment will not be repeated herein.

For example, the touch screen controller 600 may provide driving signals generated using different voltages in the pen sensing mode and in the finger sensing mode to a TP. For example, the touch screen controller 600 may generate a driving signal by using a boosting voltage from a boosting circuit 620 in the pen sensing mode, and may generate a driving signal by using a first voltage having a lower level than the boosting voltage in the finger sensing mode.

In the pen sensing mode, the boosting circuit 620 adjusts a switching frequency of an internal switching operation under the control of a processor of a control circuit block 610, and may provide a boosting voltage generated based on the adjusted switching frequency to a selection circuit 630. The selection circuit 630 may further receive the first voltage that is used in the finger sensing mode, from an external PMIC. The selection circuit 630 may selectively output the boosting voltage from the boosting circuit 620 in the pen sensing mode, and may selectively output the first voltage from the external PMIC in the finger sensing mode.

Driving circuits 641 and 642 may generate driving signals by using the output voltage of the selection circuit 630, and accordingly may generate a driving signal by using the boosting voltage in the pen sensing mode and may generate a driving signal by using the first voltage having a lower level than the boosting voltage in the finger sensing mode.

A selection circuit 650 may receive the sensing signal from the TP and selectively output either to a finger AFE or a pen AFE based on a control signal from the control circuit block 610.

According to the embodiment of FIG. 11, in the pen sensing mode, a driving signal may be generated using the boosting voltage in order to form a strong electric field, but, in the finger sensing mode, a driving signal may be generated using the first voltage of a low level provided by the external PMIC. Accordingly, power consumed by a touch screen system may be reduced, and, in the finger sensing mode, an influence of noise caused due to generation of the boosting voltage may be reduced or removed.

Referring to FIG. 12, a touch screen controller 700 may be commonly used in the pen sensing mode and the finger sensing mode, and accordingly, may perform a voltage boosting function for the pen sensing mode according to the above-described embodiment. FIG. 12 illustrates an example in which a boosting circuit 720 generates voltages having a plurality of levels. When operations of the components shown in FIG. 12 are described, a description of FIG. 12 that is the same as given above with reference to the above-described embodiment will not be repeated herein.

For example, the touch screen controller 700 may include a control circuit block 710, the boosting circuit 720, and first and second driving circuits 731 and 732, and a processor of the control circuit block 710 may adjust a frequency of an internal switching operation of the boosting circuit 720 and also adjust a level of a voltage output by the boosting circuit 720.

For example, in the pen sensing mode, the control circuit block 710 may control the boosting circuit 720 to perform an internal switching operation according to a first frequency during the driving period, and may control the boosting circuit 720 to interrupt the internal switching operation during the sensing period. The control circuit block 710 may control the boosting circuit 720 to generate a first voltage having a lower level than the boosting voltage in the finger sensing mode, compared with the driving period of the pen sensing mode. FIG. 12 illustrates an example in which the boosting circuit 720 generates a boosting voltage of 20V in the pen sensing mode and generates a relatively low voltage of 5V in the finger sensing mode. In some examples, the boosting circuit 720 may generate the same boosting voltage having a range of 10-20V in the pen and finger sensing modes.

According to the embodiment of FIG. 12, because the boosting circuit 720 is able to provide voltages for generating driving signals in the pen sensing mode and in the finger sensing mode, a special PMIC does not need to be included in a touch screen system. Moreover, because a driving signal is generated using a relatively low voltage in the finger sensing mode, power consumption in the touch screen system may be reduced. According to an embodiment, when the boosting circuit 720 generates the low voltage, based on the internal switching operation, in the finger sensing mode, a frequency of the internal switching operation of the boosting circuit 720 in the finger sensing mode may be set to be less than in the pen sensing mode (e.g., in the driving period of the pen sensing mode).

Figure 13:
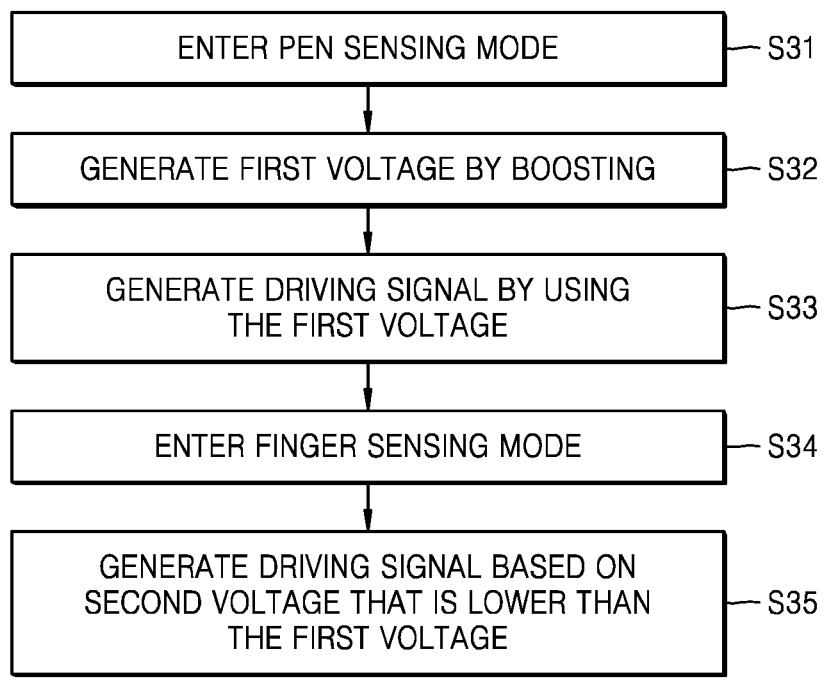
FIG. 13 is a flowchart of an example of adjusting a voltage level of a driving signal for each touch sensing mode according to example embodiments.

FIG. 13 is a flowchart of an example of adjusting a voltage level of a driving signal for each touch sensing mode according to example embodiments.

Referring to FIG. 13, a touch screen controller may enter the pen sensing mode in operation S31. In operation S32, a first voltage based on the above-described boosting may be generated. The first voltage may have a relatively high voltage and may be generated via an internal switching operation. In operation S33, a driving signal may be generated using the first voltage. The generated driving signal may be provided to a TP.

Thereafter, in operation S34, the touch screen controller enters the finger sensing mode. In operation S35, a driving signal based on a second voltage lower than the first voltage may be generated. The first voltage and the second voltage may be generated using any of various methods. For example, the second voltage may be generated by a boosting circuit adjusting the level of an output voltage of the boosting circuit, or may be generated by an internal voltage generator included in the touch screen controller. Alternatively, the second voltage may be generated by a special external chip (for example, a PMIC) outside the touch screen controller and may be provided to the touch screen controller.

Figure 14:
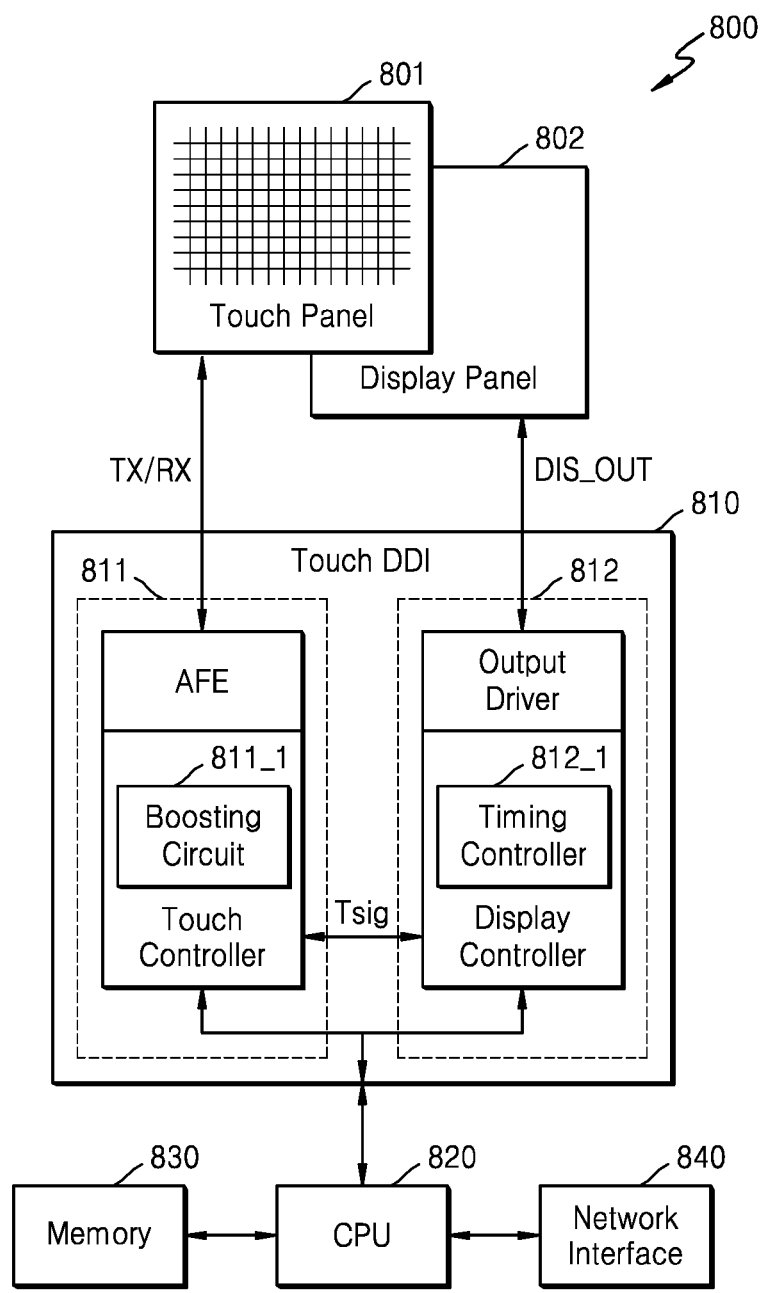
FIG. 14 is a block diagram illustrating an example in which a touch screen controller according to an embodiment of the inventive concept is implemented using a touch display driver IC (DDI)

FIG. 14 is a block diagram illustrating an example in which a touch screen controller according to an embodiment of the inventive concept is implemented using a touch display driver IC (DDI). FIG. 14 further illustrates a TP together with the touch DDI, and further illustrates a system that processes touch information from the touch DDI.

Referring to FIG. 14, an electronic apparatus 800 may include a TP 801, a display panel 802, a touch DDI 810, a central processing unit (CPU) 820, a memory 830, and a network interface 840. When a TP is implemented using an in-cell type or an on-cell type as described above, the TP 801 may be described as being included in the display panel 802.

The CPU 820 may control an overall operation of the electronic apparatus 800 by executing instructions stored in the memory 830 or a memory included in the CPU 820. For example, the CPU 820 may provide image data to the touch DDI 810, may determine occurrence or non-occurrence of a touch by a finger or a pointer and a touch location by interpreting touch information received from the touch DDI 810, and may control a function of the electronic apparatus 800 according to a result of the determination. According to an embodiment, the CPU 820 may be a component included in a system-on-chip (SoC) including a plurality of Intellectual Property (IP) blocks, and the SoC may be referred to as an application processor (AP).

The memory 830 may be accessed by the CPU 820. Examples of the memory 830 may include, as non-volatile memory, Electrically Erasable Programmable Read-Only Memory (EEPROM), flash memory, Phase Change Random Access Memory (PRAM), Resistance Random Access Memory (RRAM), Nano Floating Gate Memory (NFGM), Polymer Random Access Memory (PoRAM), Magnetic Random Access Memory (MRAM), and Ferroelectric Random Access Memory (FRAM), and, as volatile memory, Dynamic Random Access Memory (DRAM), Static Random Access Memory (SRAM), mobile DRAM, Double Data Rate Synchronous Dynamic Random Access Memory (DDR SDRAM), Low Power DDR (LPDDR) SDRAM, Graphic DDR (GDDR) SDRAM, and Rambus Dynamic Random Access Memory (RDRAM).

The network interface 840 may provide an interface for an external network of the electronic apparatus 800 to the CPU 820. For example, the network interface 840 may be connected to a wired or wireless network, and may transmit a signal received from the network to the CPU 820 or transmit a signal received from the CPU 820 to the network.

The touch DDI 810 may be implemented using a single semiconductor chip, and may include a touch control block 811 for controlling the TP 801 and a display driving block 812 for controlling the display panel 802. In other words, the touch control block 811 and the display driving block 812 may be manufactured on the same substrate and integrated into a single semiconductor chip.

The touch control block 811 may include components included in the touch screen controller according to the above-described embodiments. For example, the touch control block 811 may include an AFE circuit and a touch controller. The touch control block 811 and the display driving block 812 may transmit or receive at least one signal Tsig within the single semiconductor chip. When the number of signals Tsig is plural, the signals Tsig are of various types.

The display driving block 812 may include an output driver and a display controller. Although not shown in FIG. 14, the display driving block 812 may further include other components for realizing an image, for example, a gate driver and a power generator.

The touch control block 811 may include a DC-to-DC converter 811_1 as a boosting circuit according to the above-described embodiments. For example, the DC-to-DC converter 811_1 may be disposed within the touch controller. The touch controller may further include a circuit (not shown) that generates a control signal for controlling an internal switching operation of the DC-to-DC converter 811_1, and the DC-to-DC converter 811_1 may control a frequency of the internal switching operation in response to the control signal. In FIG. 14, a driving circuit that provides a driving signal to the TP 801 may be defined as being included in the AFE circuit, and the DC-to-DC converter may generate a boosting voltage and provide the generated boosting voltage to the AFE circuit.

The display controller may include a timing controller 812_1 that generates various pieces of timing information in relation to a display operation. For example, the timing controller 812_1 may generate a vertical synchronization signal, a horizontal synchronization signal, and the like in relation to a display operation, or may generate various types of timing information for controlling generation of a common electrode voltage or a gate line signal.

According to an embodiment, the touch control block 811 may use at least one piece of timing information received from the timing controller 812_1 when generating the touch information. For example, when various types of electrodes (for example, common voltage electrodes) arranged on a display panel are driven, noise may be generated within the touch control block 811. For example, the touch control block 811 may perform a sensing operation at a time when noise is minimized, based on timing information. In other words, according to embodiments of the inventive concept, noise generated by the DC-to-DC converter and noise generated by a display operation may be removed or reduced.

The touch DDI 810 of FIG. 14 may be implemented using any of various other methods. For example, the boosting voltage generated by the touch control block 811 may be provided to the display driving block 812 and may be used in the display driving block 812. Alternatively, the boosting circuit according to the above-described embodiment may be included in the display driving block 812, and a boosting voltage may be provided from the display driving block 812 to the touch control block 811. In this case, an internal switching operation for generating the boosting voltage may be controlled within the display driving block 812.

Although not shown in FIG. 14, various types of signals other than the timing information may be transmitted or received between the touch control block 811 and the display driving block 812. For example, the display driving block 812 may provide signals for controlling various types of modes related with a touch screen operation to the touch control block 811, and may generate various types of voltages for use in the touch control block 811 and provide the generated various types of voltages to the touch control block 811. The touch control block 811 may also provide various types of information representing operation states (for example, a slip state and a power down state) to the display driving block 812.

Figure 15:
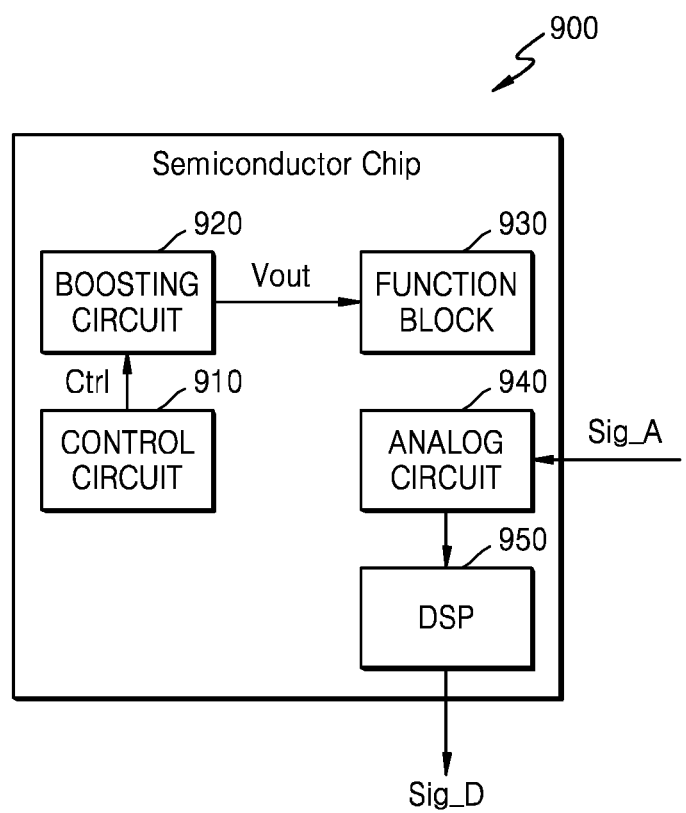
FIG. 15 is a block diagram of a semiconductor chip according to an embodiment of the inventive concept.

FIG. 15 is a block diagram of a semiconductor chip 900 according to an embodiment of the inventive concept.

In some examples, the semiconductor chip 900 may be implemented in a single semiconductor chip formed from a wafer. The semiconductor chip 900 may be referred to as a semiconductor device.

An operation of the boosting circuit according to the above-described embodiments is applicable to various types of semiconductor chips other than a touch screen controller. For example, the boosting circuit according to the above-described embodiments is applicable to various types of semiconductor chips that generate a boosting voltage that is used within the semiconductor chips or provided to the outside of the semiconductor chips and receive and process an external analog signal. Referring to FIG. 15, the semiconductor chip 900 may include a control circuit 910, a boosting circuit 920, a function block 930, an analog circuit 940, and a DSP 950.

The control circuit 910 may control an overall internal operation of the semiconductor chip 900, and may control various components included in the semiconductor chip 900. According to an embodiment, the control circuit 910 may determine an operation mode of the semiconductor chip 900 and provide information related to the operation mode to the boosting circuit 920.

The boosting circuit 920 may be used to provide power to the semiconductor chip 900, and may generate the boosting voltage Vout, based on an internal switching operation according to the above-described embodiments. The semiconductor chip 900 may provide the generated boosting voltage Vout to the outside or provide the generated boosting voltage Vout to the function block 930 of the semiconductor chip 900. The function block 930 may perform signal processing using the boosting voltage Vout.

The analog circuit 940 of the semiconductor chip 900 may receive an analog signal Sig_A from an external source, process the received analog signal Sig_A, and provide a result of the processing. According to an embodiment, the analog circuit 940 may correspond to the AFE circuit in the above-described example, or may include at least some of the components included in the AFE circuit. According to an embodiment, the analog circuit 940 may include an ADC. In this case, the analog circuit 940 may provide a processing result corresponding to a digital signal. The DSP 950 may perform a certain function by processing the digital signal received from the analog circuit 940, and may output a processing result Sig_D.

According to the above-described embodiments, the boosting circuit 920 may control a frequency of an internal switching operation, based on a control signal Ctrl received from the control circuit 910. For example, while the analog circuit 940 is processing the external analog signal Sig_A, the boosting circuit 920 may interrupt the internal switching operation or change the frequency of the internal switching operation. Accordingly, an influence of noise upon the analog circuit 940 may be reduced or removed.

While the inventive concept has been particularly shown and described with reference to embodiments thereof, it will be understood that various changes in form and details may be made therein without departing from the spirit and scope of the following claims.

What is claimed is:

1. A touch screen controller comprising:
    a driving circuit configured to output a first driving signal in a first touch mode and a second driving signal in a second touch mode, the first touch mode including a driving period and a subsequent sensing period; and
    a boosting circuit configured, in the first touch mode, to generate a first voltage by performing an internal switching operation based on an input voltage and a first switching signal, and configured to provide the first voltage to the driving circuit,
    wherein the first switching signal has a first frequency in the driving period and a second frequency different from the first frequency in the subsequent sensing period.

2. The touch screen controller of claim 1, wherein the first touch mode is a pen touch mode and the second touch mode is a finger touch mode.

3. The touch screen controller of claim 1, wherein the second frequency is less than the first frequency or is 0.

4. The touch screen controller of claim 1, wherein, in the second touch mode, the boosting circuit is further configured to generate a second voltage based on the input voltage and a second switching signal having a third frequency, and wherein the third frequency has a value obtained by dividing the first frequency by N, where N is an integer equal to or greater than 2.

5. The touch screen controller of claim 4, wherein the boosting circuit comprises a frequency modulator configured to generate the first switching signal in the first touch mode and the second switching signal in the second touch mode.

6. The touch screen controller of claim 1, wherein, in the second touch mode, the driving circuit is configured to output the second driving signal based on a second voltage generated from outside the touch screen controller.

7. The touch screen controller of claim 1, further comprising:
    an analog front end circuit including a filter configured to filter a sensing signal received from a touch panel according to a pass band, the analog front end circuit configured to process the sensing signal in the second touch mode,
    wherein a frequency of switching noise generated by an internal switching operation based on the second frequency in the boosting circuit is located outside the pass band of the filter.

8. The touch screen controller of claim 1, wherein the touch screen controller is implemented using a single semiconductor chip into which the driving circuit and the boosting circuit are integrated.

9. The touch screen controller of claim 1, wherein the boosting circuit includes a direct current (DC)-to-DC converter configured to generate the first voltage by boosting the input voltage.

10. A touch screen controller comprising:
    a driving circuit configured to output a first driving signal to a touch panel in a pen touch mode including a driving period and a subsequent sensing period;
    a boosting circuit configured, in the pen touch mode, to generate a first voltage by performing an internal switching operation based on an input voltage and a first switching signal, and configured to provide the first voltage to the driving circuit;
    a first analog front end circuit configured to receive a first sensing signal generated due to a pen touch in the subsequent sensing period of the pen touch mode and process the first sensing signal; and
    a control circuit configured to generate a control signal for controlling the internal switching operation of the boosting circuit,
    wherein the control circuit is configured to interrupt the internal switching operation in the subsequent sensing period.

11. The touch screen controller of claim 10, wherein the first switching signal has a first frequency in the driving period and a second frequency different from the first frequency in the subsequent sensing period.

12. The touch screen controller of claim 10, wherein, in a finger touch mode:
    the driving circuit outputs a second driving signal to the touch panel,
    the touch screen controller comprises a second analog front end circuit configured to receive a second sensing signal generated due to a finger touch and process the second sensing signal, and
    the boosting circuit generates a second voltage based on the input voltage and a second switching signal having a third frequency different from the first frequency and the second frequency, and provides the second voltage to the driving circuit.

13. The touch screen controller of claim 12, wherein the third frequency is less than the first frequency.

14. The touch screen controller of claim 13, wherein the third frequency has a value obtained by dividing the first frequency by N, where N is an integer equal to or greater than 2.

15. The touch screen controller of claim 12, wherein the boosting circuit comprises a frequency modulator configured to generate the first switching signal in the pen touch mode and the second switching signal in the finger touch mode.

16. The touch screen controller of claim 10, further comprising:
a display driving block configured to drive a display panel, and
wherein the display driving block comprises a timing controller configured to generate timing information related to display timing.

17. A method of operating a touch screen controller, the method comprising:
generating a first voltage by performing an internal switching operation based on a first switching signal, in a pen sensing mode including a driving period and a subsequent sensing period;
providing a first driving signal generated according to the first voltage to a touch panel;
generating a second voltage different from the first voltage by performing the internal switching operation based on a second switching signal, in a finger sensing mode; and
providing a second driving signal generated according to the second voltage to the touch panel,
wherein the first switching signal has a first frequency during the driving period and a second frequency different from the first frequency during the subsequent sensing period, and
wherein the second switching signal has a third frequency different from the first frequency.

18. The method of claim 17, wherein the second frequency is less than the first frequency or is 0, and
wherein the third frequency has a value obtained by dividing the first frequency by N, where N is an integer equal to or greater than 2.

19. The method of claim 17, wherein the performing of the internal switching operation in the subsequent sensing period of the pen sensing mode includes interrupting the internal switching operation by the first switching signal.

20. The method of claim 17, wherein the first voltage is greater than the second voltage.

* * * * *